US012737733B2

(12) United States Patent
Marques et al.

(10) Patent No.: US 12,737,733 B2
(45) Date of Patent: Sep. 15, 2026

(54) SYSTEMS AND METHODS FOR LARGE LANGUAGE MODEL (LLM) GENERATED SERVICE CONTENT

(71) Applicant: Rockwell Automation Technologies, Inc., Mayfield Heights, OH (US)

(72) Inventors: Roberto Marques, Mequon, WI (US); Michael J. Anthony, Milwaukee, WI (US); Jonathan A. Mills, Mayfield Heights, OH (US); Kurt D. Sneen, Park City, UT (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 10 days.

(21) Appl. No.: 18/655,843

(22) Filed: May 6, 2024

(65) Prior Publication Data

US 2025/0342448 A1 Nov. 6, 2025

(51) Int. Cl.
*G06Q 10/20* (2023.01)

(52) U.S. Cl.
CPC .................................... *G06Q 10/20* (2013.01)

(58) Field of Classification Search
CPC ................................ G06Q 10/20; G06F 40/56
See application file for complete search history.

(56) References Cited

U.S. PATENT DOCUMENTS

2011/0066939 A1* 3/2011 Shimada ............. G06F 11/0793 715/708
2012/0120070 A1* 5/2012 Baillot ................... G08B 25/14 345/419
2018/0088564 A1* 3/2018 Billi-Duran ...... G05B 19/41865
2022/0050937 A1* 2/2022 Stump ................. G06F 3/04847
2022/0171641 A1* 6/2022 Pichiliani ................ H04L 51/56
2023/0259821 A1* 8/2023 Travalini ............. G06N 3/0455 706/12
2023/0376847 A1* 11/2023 Travalini ............... G06N 3/088
2024/0202631 A1* 6/2024 Warren .......... G06Q 10/063114

(Continued)

FOREIGN PATENT DOCUMENTS

WO WO-2025175415 A1 * 8/2025 .......... G06F 11/0793

OTHER PUBLICATIONS

Mleczko, K. (2021). Chatbot as a tool for knowledge sharing in the maintenance and repair processes. Multidisciplinary Aspects of Production Engineering, 4(1), 499-508. (Year: 2021).*

(Continued)

*Primary Examiner* — John S. Wasaff
(74) *Attorney, Agent, or Firm* — Fletcher Yoder, P.C.

(57) ABSTRACT

A method includes receiving a work order associated with a problem experienced by an industrial automation system configured to perform an industrial automation process, receiving, from an industrial automation device within the industrial automation system, supplemental data including one or more characteristics of the industrial automation device, the industrial automation system, the industrial automation process, or any combination thereof, generating, via processing circuitry, using one or more large language models (LLMs), service content based on the work order and the supplemental data, wherein the service content includes a guided workflow for addressing the problem associated with the work order, and providing the service content to a mobile computing device for display via a user interface.

18 Claims, 5 Drawing Sheets

(56) References Cited

U.S. PATENT DOCUMENTS

| | | | | |
|---|---|---|---|---|
| 2024/0203168 | A1* | 6/2024 | Starkey | G07C 5/006 |
| 2024/0346611 | A1* | 10/2024 | Brown | G06Q 10/20 |
| 2025/0200455 | A1* | 6/2025 | Naseem | G06F 40/40 |
| 2025/0321564 | A1* | 10/2025 | Nica | G05B 19/4155 |

OTHER PUBLICATIONS

Zeng, Z., Watson, W., Cho, N., Rahimi, S., Reynolds, S., Balch, T., & Veloso, M. (Nov. 2023). FlowMind: automatic workflow generation with LLMs. In Proceedings of the Fourth ACM International Conference on AI in Finance (pp. 73-81). (Year: 2023).*

* cited by examiner

SYSTEMS AND METHODS FOR LARGE LANGUAGE MODEL (LLM) GENERATED SERVICE CONTENT

BACKGROUND

The present disclosure generally relates to performing service and/or maintenance of industrial automation devices.

Industrial automation systems may be used to provide automated control of one or more industrial automation devices (e.g., including one or more actuators) in an industrial setting. When an industrial automation device encounters a problem, service technicians are on their own to sort through available materials, such as product manuals and troubleshooting guides, to attempt to remedy the issue. Toggling between multiple sources, attempting to find relevant portions for addressing the problem can be cumbersome and time consuming. Accordingly, new techniques for providing service technicians with service content for addressing problems experienced by industrial automation systems are desired.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a method includes receiving a work order associated with a problem experienced by an industrial automation system configured to perform an industrial automation process, receiving, from an industrial automation device within the industrial automation system, supplemental data including one or more characteristics of the industrial automation device, the industrial automation system, the industrial automation process, or any combination thereof, generating, via processing circuitry, using one or more large language models (LLMs), service content based on the work order and the supplemental data, wherein the service content includes a guided workflow for addressing the problem associated with the work order, and providing the service content to a mobile computing device for display via a user interface.

In another embodiment, a method includes receiving, via a mobile computing device, service content generated using one or more large language models (LLMs) in response to receiving a work order associated with a problem experienced by an industrial automation system configured to perform an industrial automation process and supplemental data comprising one or more characteristics of an industrial automation device, the industrial automation system, the industrial automation process, or any combination thereof, wherein the service content includes a guided workflow for addressing the problem associated with the work order, displaying, via a user interface of the mobile computing device, the service content, and receiving, via the user interface of the mobile computing device, an input requesting a modification to the service content.

In a further embodiment, a non-transitory computer readable medium stores instructions that, when executed by processing circuitry, cause the processing circuitry to receive a work order associated with a problem experienced by an industrial automation system configured to perform an industrial automation process, receive, from an industrial automation device within the industrial automation system, supplemental data comprising one or more characteristics of the industrial automation device, the industrial automation system, the industrial automation process, or any combination thereof, generate, via processing circuitry, using one or more large language models (LLMs), service content based on the work order and the supplemental data, wherein the service content includes a guided workflow for addressing the problem associated with the work order, provide the service content to a mobile computing device for display via a user interface, receive, from the mobile computing device, an input indicating that the problem was resolved by performing an action, and train the one or more LLMs based on the problem being resolved by performing the action.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
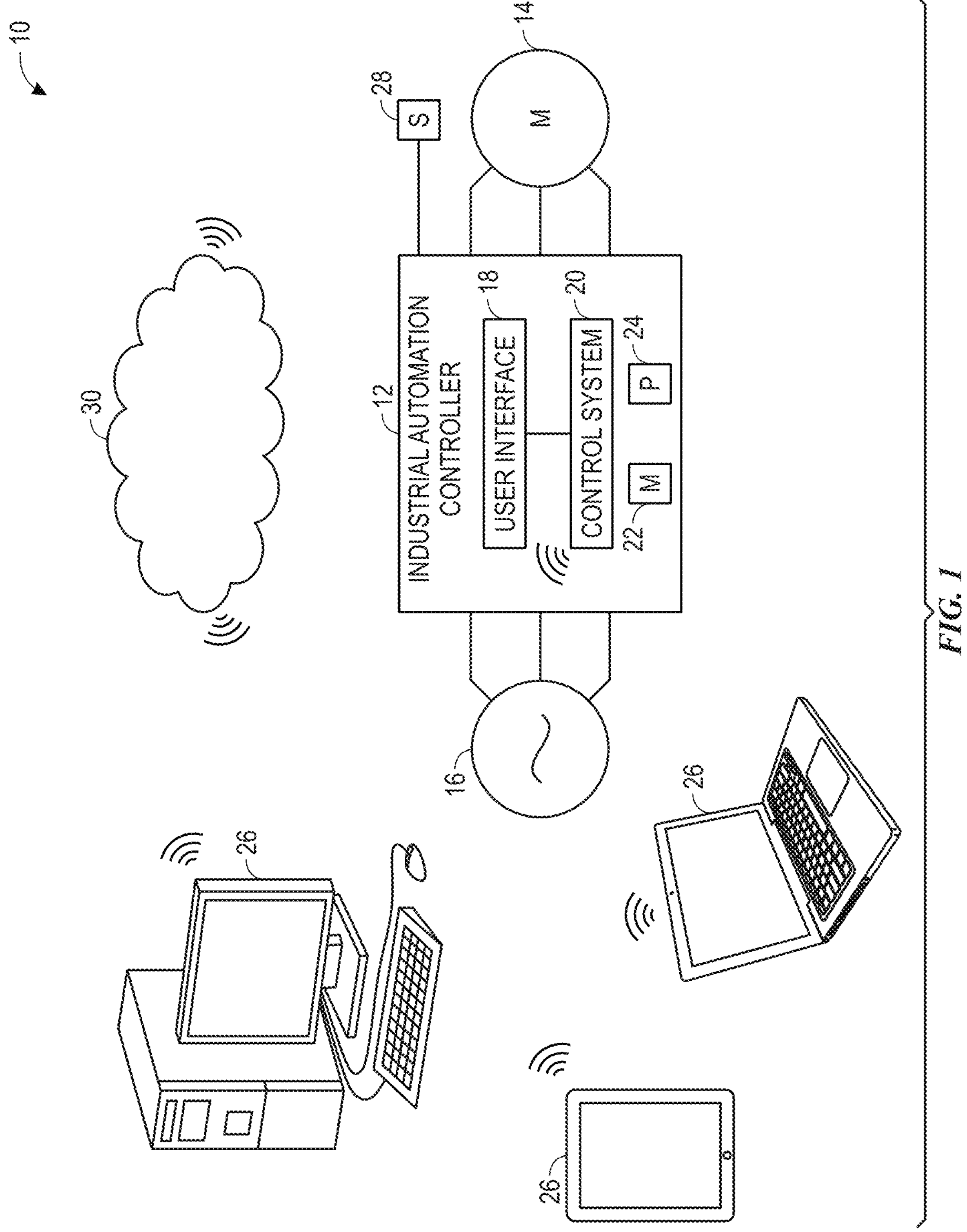
FIG. 1 is a schematic view of an industrial automation system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

When a service technician receives a work order to address a problem experienced by an industrial automation system, it may be up to the service technician to use their own knowledge and experience, and to identify relevant portions of various sources of information, such as product manuals and troubleshooting guides, to address the problem. Once the relevant information is found, toggling between multiple sources of information, or between multiple locations in the same source of information, while attempting to address the issue can be cumbersome and time consuming.

To address this, the service technician may access an LLM-based service assistant to consider information about the industrial automation system and help identify relevant information to address the problem. The LLM may be trained on, for example, product manuals, troubleshooting guides, decisions trees, data pulled from the internet (e.g., product information, instructions for performing different tasks, etc.), customer data, digested incident logs, rule sets, device operating state history, device configuration data, device health information, baseline data, time series data, log data, process data, service data, maintenance data, etc. After a work order for the problem is generated, the LLM-based service assistant may receive the work order.

In some cases, supplemental data may be received or retrieved along with the work order. For example, supplemental data may be received or retrieved from the device experiencing the problem, or from another device within the industrial automation system. The supplemental data may include, for example, service history of a device, maintenance history of a device, device configuration information, device identity information, rule sets to be applied to one or more devices, operating state history data, forensic "black box" data, device health information, baseline data, product manuals, troubleshooting guides, decision trees, instructions for performing various tasks (e.g., text, images, video, etc. pulled from internal sources within the enterprise, or from external sources, such as the internet), and so forth. The LLM-based service assistant may generate service content, such as a guided workflow, for addressing the problem experienced by the industrial automation system.

The service content may set forth a guided workflow provided via one or more documents, a mobile application, a web page, a virtual reality headset, an augmented reality device, and so forth. In some embodiments, inputs may be provided via a client device, to which the LLM-based service assistant may respond. For example, the LLM-based service assistant may use a camera or other imaging system to confirm that the service agent has all of the tools/materials used in upcoming tasks, and/or that the tasks are being performed correctly. The LLM-based service assistant may also be configured to zoom in/out, repeat utterances, provide explanation, provide more details, proceed to the next step if a step is not successful, display schematics, answer questions, and so forth. Accordingly, in some embodiments, the LLM-based service assistant may engage in an iterative, back and forth exchange with a service technician via the client device. In response to feedback from the service technician, certain actions being successful or unsuccessful, the problem being resolved or unresolved, etc., the one or more LLMs may be retrained. Additional details with regard to the LLM-based service assistant in accordance with the techniques described above will be provided below with reference to FIGS. 1-6.

By way of introduction, FIG. 1 is a schematic view of an example industrial automation system 10 in which the embodiments described herein may be implemented. As shown, the industrial automation system 10 includes a controller 12 and an actuator 14 (e.g., a motor). The industrial automation system 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger industrial automation system 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22, such as a non-transitory computer readable medium, and executable by the processor 24) to provide signals for controlling the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through software or firmware code that may be loaded onto the internal memory 22 of the control system 20 (e.g., via a locally or remotely located computing device 26) or programmed via the user interface 18 of the controller 12. The control system 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the industrial automation system 10. With feedback data from the sensors 28, the control system 20 may keep detailed track of the various conditions under which the industrial automation system 10 may be operating. For example, the feedback data may include conditions such as actual motor speed, voltage, frequency, power quality, alarm conditions, etc. In some embodiments, the feedback data may be communicated back to the computing device 26 for additional analysis.

The computing device 26 may be communicatively coupled to the controller 12 via a wired or wireless connection. The computing device 26 may receive inputs from a user defining an industrial automation project using a native application running on the computing device 26 or using a website accessible via a browser application, a software application, or the like. The user may define the industrial automation project by writing code, interacting with a visual programming interface, inputting or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the industrial automation system 10 through performance of one or more tasks and/or processes. In some applications, the controller 12 may be communicatively positioned in a private network and/or behind a firewall, such that the controller 12 does not have communication access outside a local network and is not in communication with any devices outside the firewall, other than the computing device 26. The controller 12 may collect feedback data during execution of the project, and the feedback data may be provided back to the computing device 26 for analysis. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, operator of the controller 12, owner of the controller 12, etc. The cloud server 30 may be used to help customers create and/or modify projects, to help troubleshoot any problems that may arise with the controller 12, develop policies, or to provide other services (e.g., project analysis, enabling, restricting capabilities of the controller 12, data analysis, controller firmware updates, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
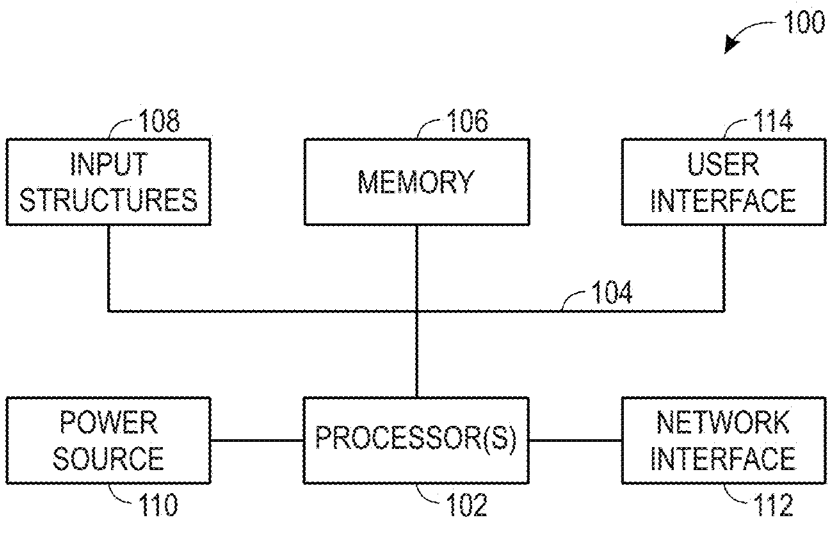
FIG. 2 is a block diagram of example components that could be used in the industrial automation system of FIG. 1, in accordance with embodiments presented herein.

FIG. 2 illustrates a block diagram of example components of a computing device 100 that could be used as the computing device 26, the cloud/remote server 30, the controller 12, or some other device within the system 10 shown in FIG. 1. As used herein, a computing device 100 may be implemented as one or more computing systems including laptop, notebook, desktop, tablet, HMI, or workstation computers, as well as server type devices or portable, communication type devices, such as cellular telephones and/or other suitable computing devices.

As illustrated, the computing device 100 may include various hardware components, such as one or more processors 102, one or more busses 104, memory 106, input structures 108, a power source 110, a network interface 112, a user interface 114, and/or other computer components useful in performing the functions described herein.

The one or more processors 102 may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines. Although shown for convenience as a single block in FIG. 2, the memory 106 may encompass various discrete media in the same or different physical locations. The one or more processors 102 may access data in the memory 106 via one or more busses 104.

The input structures 108 may allow a user to input data and/or commands to the device 100 and may include mice, touchpads, touchscreens, keyboards, controllers, and so forth. The power source 110 can be any suitable source for providing power to the various components of the computing device 100, including line and battery power. In the depicted example, the device 100 includes a network interface 112. Such a network interface 112 may allow communication with other devices on a network using one or more communication protocols. In the depicted example, the device 100 includes a user interface 114, such as a display that may display images or data provided by the one or more processors 102. The user interface 114 may include, for example, a monitor, a display, and so forth. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices.

Figure 3:
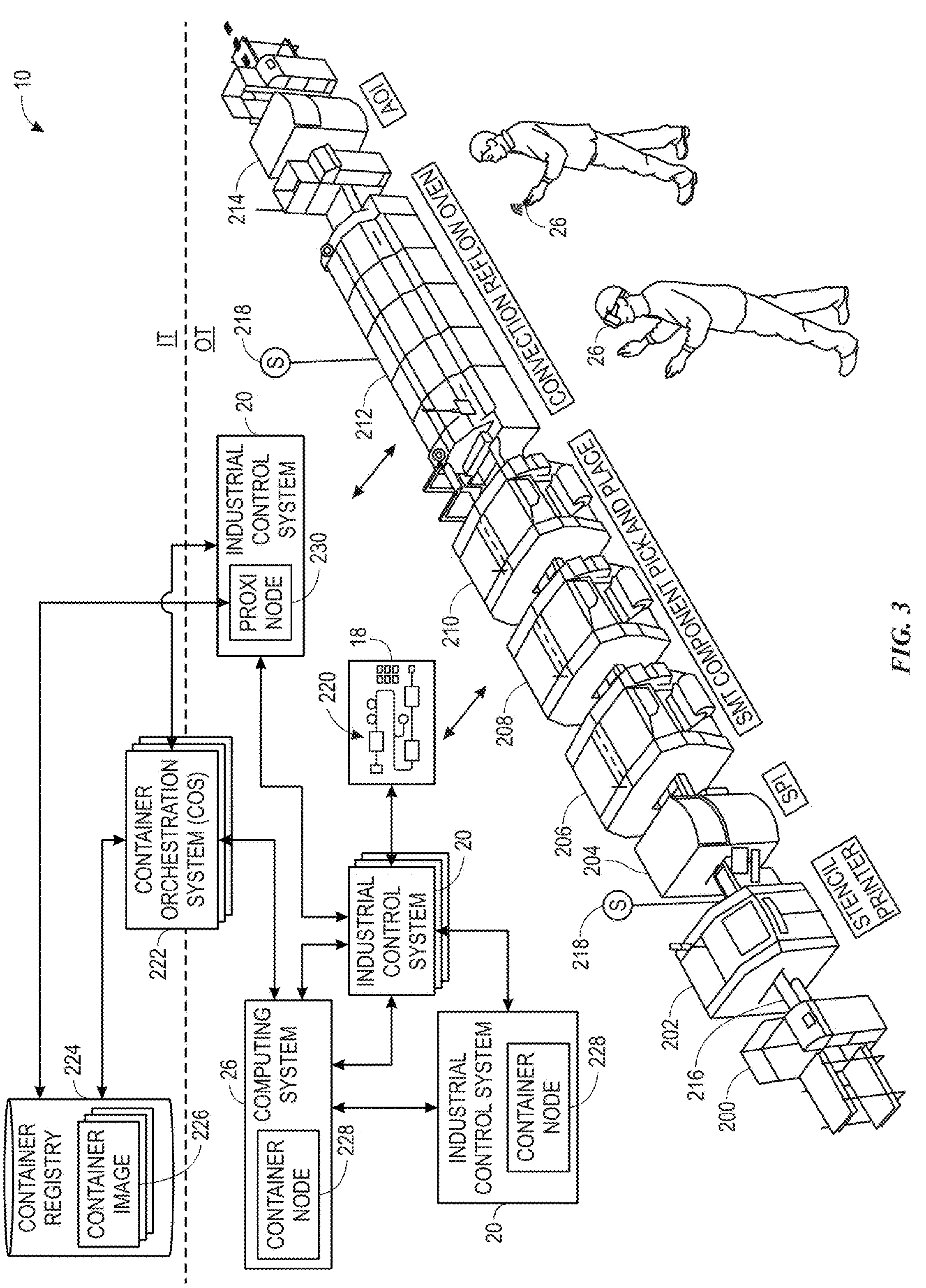
FIG. 3 is a perspective view of an example of the industrial automation system of FIG. 1 controlled by an industrial control system, in accordance with an embodiment.

FIG. 3 is a perspective view of an example of the industrial automation system 10 of FIG. 1. The industrial automation system 10 includes stations 200, 202, 204, 206, 208, 210, 212, 214 having machine components and/or machines to conduct functions within an automated process, such as printed circuit board assembly, as is depicted. The automated process may begin at a station 200 used for loading objects, such as substrates, into the industrial automation system 10 via a conveyor section 216. For example, objects may be transported along the conveyor section 216 to station 202 to perform a first action, such a printing solder paste to the substrate via stenciling. As objects exit from the station 202, the objects may be transported via the conveyor section 216 to a station 204 for solder paste inspection (SPI) to inspect printer results, to a station 206, 208, and 210 for surface mount technology (SMT) component placement, to a station 212 for convection reflow oven to melt the solder to make electrical couplings, and finally to a station 214 for automated optical inspection (AOI) to inspect the object manufactured (e.g., the manufactured printed circuit board). After the objects proceed through the various stations, the objects may be removed from the station 214, for example, for storage in a warehouse or for shipment. It should be understood, however, that, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of OT data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 200, 202, 204, 206, 208, 210, 212, 214, may be monitored and controlled by the industrial control systems 20 for regulating control variables. For example, sensing devices (e.g., sensors 218) may monitor various properties of the industrial automation system 10 and may be used by the industrial control systems 20 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 20 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 20 may include or be communicatively coupled to the display/operator interface 18 (e.g., a human-machine interface (HMI)) and to devices of the industrial automation system 10. It should be understood that any suitable number of industrial control systems 20 may be used in a particular industrial automation system 10 embodiment. The industrial control systems 20 may facilitate representing components of the industrial automation system 10 through programming objects that may be instantiated and executed to provide simulated functionality similar or identical to the actual components, as well as visualization of the components, or both, on the display/operator interface 18. The programming objects may include code and/or instructions stored in the industrial control systems 20 and executed by processing circuitry of the industrial control systems 20. The processing circuitry may communicate with memory circuitry to permit the storage of the component visualizations.

As illustrated, a display/operator interface 18 may be configured to depict representations 220 of the components of the industrial automation system 10. The industrial control system 20 may use data transmitted by the sensors 218 to update visualizations of the components via changing one or more statuses, states, and/or indications of current operations of the components. These sensors 218 may be any suitable device adapted to provide information regarding process conditions. Indeed, the sensors 218 may be used in a process loop (e.g., control loop) that may be monitored and controlled by the industrial control system 20. As such, a process loop may be activated based on process inputs (e.g., an input from the sensor 218) or direct input from a person via the display/operator interface 18. The person operating and/or monitoring the industrial automation system 10 may reference the display/operator interface 18 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 218 may gather OT data indicative of one or more operations of the industrial automation system 10 or the industrial control system 20. In this way, the OT data may be analog data or digital data indicative of measurements, statuses, alarms, or the like associated with operation of the industrial automation system 10 or the industrial control system 20.

The industrial control systems 12 described above may operate in an OT space in which OT data is used to monitor and control OT assets, such as the equipment illustrated in the stations 200, 202, 204, 206, 208, 210, 212, 214 of the industrial automation system 10 or other industrial equipment. The OT space, environment, or network generally includes direct monitoring and control operations that are coordinated by the industrial control system 20 and a corresponding OT asset. For example, a programmable logic controller (PLC) may operate in the OT network to control operations of an OT asset (e.g., drive, motor, and/or high-level controllers). The industrial control systems 20 may be specifically programmed or configured to communicate directly with the respective OT assets.

A container orchestration system 222, on the other hand, may operate in an information technology (IT) environment. That is, the container orchestration system 222 may include a cluster of multiple computing devices that coordinates an automatic process of managing or scheduling work of individual containers for applications within the computing devices of the cluster. In other words, the container orchestration system 222 may be used to automate various tasks at scale across multiple computing devices. By way of example, the container orchestration system 222 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 222 may use configuration files to determine a network protocol to facilitate communication between containers, a storage location to save logs, and the like. The container orchestration system 222 may also schedule deployment of containers into clusters and identify a host (e.g., node) that may be best suited for executing the container. After the host is identified, the container orchestration system 222 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 224 as container images 226. The container registry 224 may be any suitable data storage or database that may be accessible to the container orchestration system 222. The container image 226 may correspond to an executable software package that includes the tools and data employed to execute a respective application. That is, the container image 226 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 222. The deployment configuration file may be stored in the container registry 224 along with the respective container images 226 associated with the deployment configuration file. The deployment configuration file may include a list of different pods and a number of replicas for each pod that should be operating within the container orchestration system 222 at any given time. Each pod may correspond to a logical unit of an application, which may be associated with one or more containers. The container orchestration system 222 may coordinate the distribution and execution of the pods listed in the deployment configuration file, such that the desired state is continuously met. In some embodiments, the container orchestration system 222 may include a master node that retrieves the deployment configuration files from the container registry 224, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 222 may include a cluster of computing devices, computing systems, or container nodes that may work together to achieve certain specifications or states, as designated in the respective container. In some embodiments, container nodes 228 may be integrated within industrial control systems 20 as shown in FIG. 3. That is, container nodes 228 may be implemented by the industrial control systems 20, such that they appear as worker nodes to the master node in the container orchestration system 222. In this way, the master node of the container orchestration system 222 may send commands to the container nodes 228 that are also configured to perform applications and operations for the respective industrial equipment.

With this in mind, the container nodes 228 may be integrated with the industrial control systems 20, such that they serve as passive-indirect participants, passive-direct participants, or active participants of the container orchestration system 222. As passive-indirect participants, the container nodes 228 may respond to a subset of all of the commands that may be issued by the container orchestration system 222. In this way, the container nodes 228 may support limited container lifecycle features, such as receiving pods, executing the pods, updating a respective filesystem to included software packages for execution by the industrial control system 20, and reporting the status of the pods to the master node of the container orchestration system 222. The limited features implementable by the container nodes 228 that operate in the passive-indirect mode may be limited to commands that the respective industrial control system 20 may implement using native commands that map directly to the commands received by the master node of the container orchestration system 222. Moreover, the container node 228 operating in the passive-indirect mode of operation may not be capable to push the packages or directly control the operation of the industrial control system 20 to execute the package. Instead, the industrial control system 20 may periodically check the file system of the container node 228 and retrieve the new package at that time for execution.

As passive-direct participants, the container nodes 228 may operate as a node that is part of the cluster of nodes for the container orchestration system 222. As such, the container node 228 may support the full container lifecycle features. That is, container node 228 operating in the passive-direct mode may unpack a container image and push the resultant package to the industrial control system 20, such that the industrial control system 20 executes the package in response to receiving it from the container node 228. As such, the container orchestration system 222 may have access to a worker node that may directly implement commands received from the master node onto the industrial control system 20.

In the active participant mode, the container node 228 may include a computing module or system that hosts an operating system (e.g., Linux) that may continuously operate a container host daemon that may participate in the management of container operations. As such, the active participant container node 228 may perform any operations that the master node of the container orchestration system 222 may perform. By including a container node 228 operating in the OT space, the container orchestration system 222 is capable of extending its management operations into the OT space (e.g., the container node 228 may provision devices in the OT space).

A proxy node 230, which may be an instance of the container node 228 or a different container node 228, may provide bi-directional coordination between the IT space and the OT space, and the like. For instance, the container node 228 operating as the proxy node 230 may intercept orchestration commands and cause industrial control system 20 to implement appropriate machine control routines based on the commands. The industrial control system 20 may confirm the machine state to the proxy node 230, which may then reply to the master node of the container orchestration system 222 on behalf of the industrial control system 20.

Additionally, the industrial control system 20 may share an industrial automation device tree via the proxy node 230. As such, the proxy node 230 may provide the master node with state data, address data, descriptive metadata, versioning data, certificate data, key information, and other relevant parameters concerning the industrial control system 20. Moreover, the proxy node 230 may issue requests targeted to other industrial control systems 20 to control other industrial automation devices. For instance, the proxy node 230 may translate and forward commands to a target industrial automation device using one or more OT communication protocols, may translate and receive replies from the industrial automation device s, and the like. As such, the proxy node 230 may perform health checks, provide configuration updates, send firmware patches, execute key refreshes, and other OT operations for other industrial automation devices.

In some embodiments, the industrial automation system 10 may include one or more mobile computing devices 26. The one or more mobile computing devices 26 may include, for example, mobile phones, tablets, human machine interfaces (HMIs), virtual reality systems, augmented reality systems, or any other battery-operated computing device having a memory, processing circuitry, and a user interface. In some embodiments, the mobile computing devices 26 may also be equipped with one or more sensors that may be integrated within the mobile computing device 26 or communicatively coupled to the mobile computing device 26, and may include, for example, cameras or other imaging components, microphones, accelerometers, gyroscopes, global positioning system (GPS) sensors, Bluetooth sensors, etc. The mobile computing device 26 may be carried by a human service technician or docked in or near the industrial automation system. In some embodiments, the mobile computing device 26 may be coupled to a component of the industrial automation system 10 via a docking station.

As will be described in more detail below, the mobile computing device 26 may be configured to display service content (e.g., a guided workflow) for a service technician to work through to address a problem experienced by an industrial automation system. For example, when an industrial automation system, or an industrial automation device within an industrial automation system, experiences a problem, a work order may be generated. An LLM-based service assistant may receive the work order, along with one or more pieces of supplemental data (e.g., service history of a device, maintenance history of a device, device configuration information, device identity information, rule sets to be applied to one or more devices, operating state history data, forensic "black box" data, device health information, baseline data, product manuals, troubleshooting guides, decision trees, instructions for performing various tasks (e.g., text, images, video, etc. pulled from internal sources within the enterprise, or from external sources, such as the internet), and so forth), if any, and generate service content, such as a guided workflow, to assist the service technician in addressing the problem. The LLM-based service assistant may run on the mobile computing device 26, an on-prem server, a cloud/remote server, an edge device (e.g., in a container), or on some other compute surface within the industrial automation system, or some combination thereof (e.g., the service content may be generated by one computing system and then served to the mobile computing device for viewing).

The service content may take the form of a document to be viewed on the mobile computing device 26, a webpage viewable on the mobile computing device, a mobile application, a virtual or augmented reality application/environment, and so forth. In some embodiments, the service content may be static, such as a document, in that the service content remains the same once generated. In other embodiments, the service content may be dynamic in that the service content may adjust in response to inputs provided to the mobile computing device 26 by the service technician. For example, inputs may include images of tools on hand, images of tasks being performed, requests to zoom in/out, requests to repeat utterances or provide explanations or additional information, requests to proceed to the next step if a step is not successful, requests to answer questions, display schematics, answer questions, etc. In some embodiments, the inputs may include feedback that a problem was successfully resolved, that the problem could not be resolved, that the service assistant provided correct or incorrect information, and so forth. In such cases, the feedback may be used to retrain the LLM for improved operation in the future.

Figure 4:
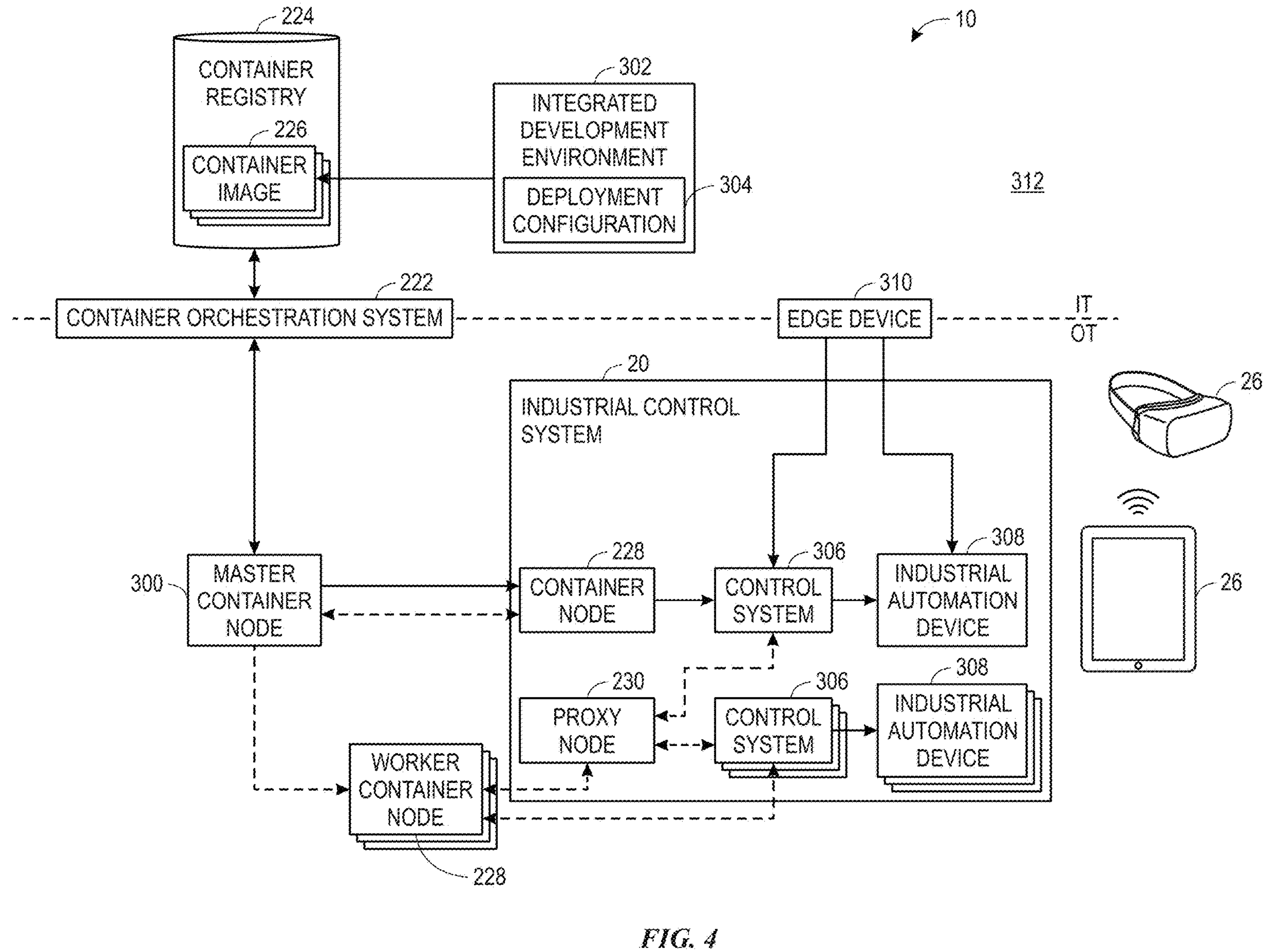
FIG. 4 is a block diagram of an example operational technology (OT) network, including the industrial control system of FIG. 3, that coordinates with a container orchestration system, in accordance with an embodiment.

FIG. 4 illustrates a block diagram that depicts the relative positions of the container node 228 and the proxy node 230 with respect to the container orchestration system 222. As mentioned above, the container orchestration system 222 may include a collection of nodes that are used to achieve a desired state of one or more containers across multiple nodes. As shown in FIG. 4, the container orchestration system 222 may include a master node 300 that may execute control plane processes for the container orchestration system 222. The control plane processes may include the processes that enable the container orchestration system 222 to coordinate operations of the container nodes 228 to meet the desired states. As such, the master container node 300 may execute an applications programming interface (API) for the container orchestration system 222, a scheduler component, core resource controllers, and the like. By way of example, the master container node 300 may coordinate all of the interactions between nodes of the cluster that make up the container orchestration system 222. Indeed, the master container node 300 may be responsible for deciding the operations that will run on container nodes 228 including scheduling workloads (e.g., containerized applications), managing the workloads' lifecycle, scaling, and upgrades, managing network and storage resources for the workloads, and the like. The master container node 300 may run an API server to handle requests and status updates received from the container nodes 228.

By way of operation, an integrated development environment (IDE) tool 302 may be used by an operator to develop a deployment configuration file 304. As mentioned above, the deployment configuration file 304 may include details regarding the containers, the pods, constraints for operating the containers/pods, and other information that describe a desired state of the containers specified in the deployment configuration file 304. In some embodiments, the deployment configuration file 304 may be generated in a YAML file, a JSON file, or other suitable file format that is compatible with the container orchestration system 222. After the IDE tool 302 generates the deployment configuration file 304, the IDE tool 302 may transmit the deployment configuration file 304 to the container registry 224, which may store the file along with container images 226 representative of the containers stored in the deployment configuration file 304.

In some embodiments, the master container node 300 may receive the deployment configuration file 304 via the container registry 224, directly from the IDE tool 302, or the like. The master container node 300 may use the deployment configuration file 304 to determine a location to gather the container images 226, determine communication protocols to use to establish networking between container nodes 228, determine locations for mounting storage volumes, locations to store logs for the containers, and the like.

Based on the desired state provided in the deployment configuration file 304, the master container node 300 may deploy containers to the container host nodes 228. That is, the master container node 300 may schedule the deployment of a container based on constraints (e.g., CPU or memory availability) provided in the deployment configuration file 304. After the containers are operating on the container nodes 228, the master container node 300 may manage the lifecycle of the containers to ensure that the containers specified by the deployment configuration file 304 are operating according to the specified constraints and the desired state.

Keeping the foregoing in mind, the industrial control system 20 may not use an operating system (OS) that is compatible with the container orchestration system 222. That is, the container orchestration system 222 may be configured to operate in the IT space that involves the flow of digital information. In contrast, the industrial control system 20 may operate in the OT space that involves managing the operation of physical processes and the machinery used to perform those processes. For example, the OT space may involve communications that are formatted according to OT communication protocols, such as FactoryTalk LiveData, EtherNet/IP, Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, Lon Works, DALI, BACnet, KNX, EnOcean). Because the industrial control systems 20 operate in the OT space, the industrial control systems may not be capable of implementing commands received via the container orchestration system 222.

In certain embodiments, the container node 228 may be programmed or implemented in the industrial control system 20 to serve as a node agent that can register the industrial control system 20 with the master container node 300. The node agent may or may not be the same as the proxy node 230 shown in FIG. 3. For example, the industrial control system 20 may include a PLC that cannot support an operating system (e.g., Linux) for receiving and/or implementing requested operations issued by the container orchestration system 222. However, the PLC may perform certain operations that may be mapped to certain container events. As such, the container node 228 may include software and/or hardware components that may map certain events or commands received from the master container node 300 into actions that may be performed by the PLC. After converting the received command into a command interpretable by the PLC, the container node 228 may forward the mapped command to the PLC that may implement the mapped command. As such, the container node 228 may operate as part of the cluster of nodes that make up the container orchestration system 222, while a first control system 306 (e.g., PLC) that coordinates the OT operations for a second industrial automation device 308 in the industrial control system 12. The first control system 306 may include a controller, such as a PLC, an HLC, a programmable automation controller (PAC), or any other controller that may monitor, control, and operate an industrial automation device or component.

The industrial automation device 308 may correspond to an industrial automation device or component and may include any suitable industrial device that operates in the OT space. As such, the industrial automation device 308 may be involved in adjusting physical processes being implemented via the industrial system 10. In some embodiments, the industrial automation device 308 may include motors, contactors, starters, sensors, drives, relays, protection devices, switchgear, compressors. In addition, the industrial automation device 308 may also be related to various industrial equipment such as mixers, machine conveyors, tanks, skids, specialized original equipment manufacturer machines, and the like. The industrial automation device 308 may also be associated with devices used by the equipment such as scanners, gauges, valves, flow meters, and the like.

In the present embodiments described herein, the control system 306 may thus perform actions based on commands received from the container node 228. By mapping certain container lifecycle states into appropriate corresponding actions implementable by the control system 306, the container node 228 enables program content for the industrial control system 20 to be containerized, published to certain registries, and deployed using the master container node 300, thereby bridging the gap between the IT-based container orchestration system 222 and the OT-based industrial control system 20.

In some embodiments, the container node 228 may operate in an active mode, such that the container node may invoke container orchestration commands for other container nodes 228. For example, a proxy node 230 may operate as a proxy or gateway node that is part of the container orchestration system 222. The proxy node 230 may be implemented in a sidecar computing module that has an operating system (OS) that supports the container host daemon. In another embodiment, the proxy node 230 may be implemented directly on a core of the control system 306 that is configured (e.g., partitioned), such that the control system 306 may operate using an operating system that allows the container node 228 to execute orchestration commands and serve as part of the container orchestration system 222. In either case, the proxy node 230 may serve as a bi-directional bridge for IT/OT orchestration that enables automation functions to be performed in IT devices based on OT data and in industrial automation control systems 306 and industrial automation devices 308 based on IT data. For instance, the proxy node 230 may acquire industrial automation device tree data, state data for an industrial automation device, descriptive metadata associated with corresponding OT data, versioning data for industrial automation control systems 306 and industrial automation devices 308, certificate/key data for the industrial automation device, and other relevant OT data via OT communication protocols. The proxy node 230 may then translate the OT data into IT data that may be formatted to enable the master container node 300 to extract relevant data (e.g., machine state data) to perform analysis operations and to ensure that the container orchestration system 222 and the connected control systems 306 are operating at the desired state. Based on the results of its scheduling operations, the master container node 300 may issue supervisory control commands to targeted industrial automation device via the proxy nodes 230, which may translate and forward the translated commands to the respective control system 306 via the appropriate OT communication protocol.

In addition, the proxy node 230 may also perform certain supervisory operations based on its analysis of the machine state data of the respective control system 306. As a result of its analysis, the proxy node 230 may issue commands and/or pods to other nodes that are part of the container orchestration system 222. For example, the proxy node 230 may send instructions or pods to other worker container nodes 228 that may be part of the container orchestration system 222. The worker container nodes 228 may corresponds to other container nodes 228 that are communicatively coupled to other control systems 306 for controlling other industrial automation devices 308. In this way, the proxy node 230 may translate or forward commands directly to other control systems 306 via certain OT communication protocols or indirectly via the other worker container nodes 228 associated with the other control systems 306. In addition, the proxy node 230 may receive replies from the control systems 306 via the OT communication protocol and translate the replies, such that the nodes in the container orchestration system 222 may interpret the replies. In this way, the container orchestration system 222 may effectively perform health checks, send configuration updates, provide firmware patches, execute key refreshes, and provide other services to industrial automation devices 308 in a coordinated fashion. That is, the proxy node 230 may enable the container orchestration system to coordinate the activities of multiple control systems 306 to achieve a collection of desired machine states for the connected industrial automation devices 308.

As shown in FIG. 4, the industrial automation system 10 may include one or more edge devices 310 that interact with OT assets 306, 308 within the industrial automation system 10. As used herein, an "edge device" 310 is a device within the industrial automation system 10 that controls data flow within the industrial automation system 10 (e.g., the OT network) as well as between the industrial automation system 10 (e.g., the OT network) and an IT network 312. For example, the edge device 310 may be a router, a switch, or the like. In certain embodiments, the edge device 310 may receive data from the network 312 that may include, for example, an enterprise system, a server device, a plant management system, or the like. The enterprise system may include software and/or hardware components that support business processes, information flows, reporting, data analytics, service/maintenance, and the like for an enterprise. The server device may manage communication between the components of the industrial automation system 10. The plant management system may include any suitable management computing system that receives data from a number of control systems (e.g., industrial control systems 20). As such, the plant management system may track operations of one or more facilities and one or more locations. In addition, the plant management system may issue control commands to the components of the industrial automation system 10.

As previously described, the mobile computing device 26 may be carried by a service technician and used to service and address problems encountered by one or more components of the industrial automation system. In some embodiments, the mobile computing device 26 may have the same or similar capabilities as the edge device 310. In some embodiments, the mobile computing device 26 may also act as a container node configured to run one or more containers. The mobile computing device 26 may run a native service application that includes the LLM-based service assistant, or access the LLM-based service assistant via a web browser.

Figure 5:
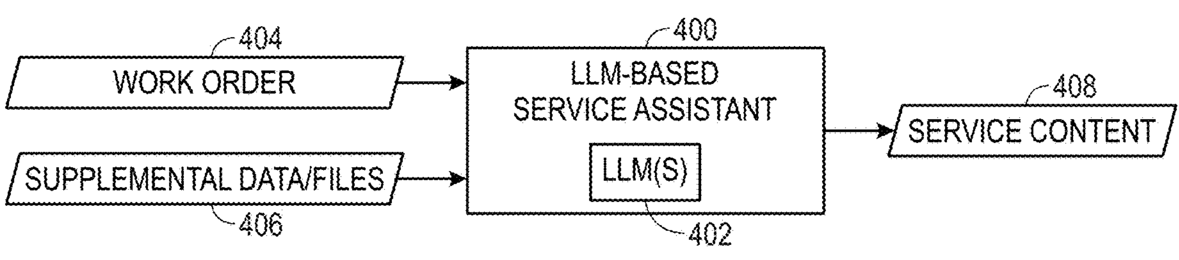
FIG. 5 is a schematic view of a large language model (LLM)-based service assistant for use in the OT network of FIG. 4, in accordance with an embodiment.

Typically, when an industrial automation system or industrial automation device within an industrial automation system encounters a problem, service technicians are on their own to sort through available materials, such as product manuals and troubleshooting guides, to attempt to remedy the problem. Toggling between multiple sources, attempting to find relevant portions for addressing the problem can be cumbersome and time consuming. An LLM-based service assistant may be used to consider information about the industrial automation system and help identify relevant information to address the problem. FIG. 5 is a schematic diagram of the LLM-based service assistant 400. As shown, the LLM-based service assistant 400 may include or rely on one or more LLMs 402. The one or more LLMs 402 may be trained on, for example, product manuals, troubleshooting guides, decisions trees, data pulled from the internet (e.g., product information, instructions for performing different tasks, etc.), customer data, digested incident logs, rule sets, device operating state history, device configuration data, device health information, baseline data, time series data, log data, process data, service data, maintenance data, and so forth. In some embodiments, the one or more LLMs 402, or an application/service that manages the one or more LLMs, may recognize that one of the LLMs 402 lacks training data in a particular area or lacks a specific source of information to ground the LLM's 402 responses in truth. Accordingly, one or more queries may be generated to retrieve such data from available databases, from the internet via an internet/web search, or from some other available information source.

In some embodiments, the one or more LLMs 402 may be trained by a service provider that provides industrial automation system service and/or maintenance services to multiple customers, collects data from those customers in the provision of the industrial automation system service and/or maintenance services, and trains the one or more LLMs 402 based on the collected data. However, in other embodiments, the one or more LLMs 402 may be trained and operated by the enterprise that operates the industrial automation system and/or the OT network. In such embodiments, the operator of the one or more LLMs 402 may utilize externally available data (e.g., publicly available data or data accessible via a data subscription service) to diversify training data for the one or more LLMs 402.

In some embodiments, the LLM-based service assistant 400 may run on premises ("on-prem") in the same facility as the industrial automation system. In such embodiments, the LLM-based service assistant 400 may run on an on-prem server, on a computing device (e.g., a workstation computer, a laptop computer, a tablet, a mobile device, a human-machine interface (HIM)), edge devices, virtual/augmented reality device, or on a compute surface within the IT or OT network. In such an embodiment, the compute surface may be available on any device having a processor and a memory with excess processing and/or memory capabilities to run the LLM-based service security assistant 400. Accordingly, compute surfaces may be available on controllers, drives, IoT devices, or other devices within the industrial automation system and OT network. In some embodiments, the LLM-based service assistant 400 may run in a container (e.g., as a containerized application) on a compute surface within the OT network or IT network.

In other embodiments, the LLM-based service assistant 400 may run on a cloud or remote server that may be accessible via one or more computing device within the IT or OT networks. In further embodiments, the LLM-based service assistant 400 may include one or more on-prem instantiations and one or more remote/cloud instantiations that may be capable of communicating with one another.

The LLM-based service assistant 400 may run as a native application or be accessible via a web browser of a computing device. As shown, a work order 404 may be provided to the LLM-based service assistant 400. The work order 404 may be automatically generated when some condition (e.g., a problem being experienced) is detected/reported, or generated based on inputs provided by a person describing a problem being experienced by the industrial automation system. In some embodiments, the work order 404 may be accompanied by one or more pieces of supplemental data or files. The supplemental data may include, for example, service history of a device, maintenance history of a device, device configuration information, device identity information, rule sets to be applied to one or more devices, operating state history data, forensic "black box" data, device health information, baseline data, product manuals, troubleshooting guides, decision trees, instructions for performing various tasks (e.g., text, images, video, etc. pulled from internal sources within the enterprise, or from external sources, such as the internet), and so forth.

For example, in some embodiments, the supplemental data may include service and/or maintenance history for one or more devices experiencing the problem. The LLM-based service assistant 400 may parse the service and/or maintenance history to determine whether the service and/or maintenance history provides any indications as to how the problem occurred, why the problem occurred, and/or how to remedy the problem. For example, the LLM-based service assistant 400 may consider whether maintenance/service was performed at regular or recommended intervals, whether the service and/or maintenance history indicated one or more faulty components, previous notes made by service/maintenance technicians, previous problems experienced by the device, whether recalled parts have been replaced, whether the service and/or maintenance history indicates harsh operating conditions, improper operation, and so forth.

The supplemental data may also include operating state history data for the device. For example, the operating state history data may include device fault history, alarm history, status history, device configuration, and so forth. The LLM-based service assistant 400 may utilize artificial intelligence and/or machine learning to recognize trends in the history or the device to determine how the problem occurred, why the problem occurred, and/or how to remedy the problem. For example, the LLM-based service assistant 400 may consider whether the device was operated within recommended operating parameters and other factors that may be indicative of the problem.

The supplemental data may also include black box data, which may include one or more forensic files indicative of what was happening with the device prior to the device experiencing the problem (e.g., a fault). The LLM-based service assistant 400 consider the black box data to determine how the problem occurred, why the problem occurred, and/or how to remedy the problem.

In other embodiments, the supplemental data may include device health information, such as providing baseline data reported at startup to one or more models and running calculations to identify deviations from baseline. Deviations from baseline may help the LLM-based service assistant 400 to determine how the problem occurred, why the problem occurred, and/or how to remedy the problem.

Based on the work order 404 and the supplemental data/files 406, if any, the LLM-based service assistant 400 may utilize the one or more LLM(s) 402 to generate service content 408. The output may vary based on the work order, the supplemental data, and the application being used.

In some embodiments, the service content 408 may be a static file, such as a PDF, that can be viewed on a mobile computing device or printed on paper. The static document may provide the service technician with instructions (e.g., a guided workflow) for diagnosing and resolving the problem that are unique to the device and the circumstances under which it was operating when the problem occurred. Accordingly, the service content 408 may include a trouble shooting guide, a list of steps, flow charts, images, schematics, and so forth that can be utilized by the service technician.

In other embodiments, the service content 408 may take the form of static or dynamic content to be displayed in a mobile application or a web page via a web browser of a mobile computing device. As with the static file described above, if the service content in the application or web page is static, the content may provide the service technician with instructions (e.g., a guided workflow) for diagnosing and resolving the problem that are unique to the device and the circumstances under which it was operating when the problem occurred without being responsive to inputs. However, if the service content 408 is dynamic, inputs may be provided that cause the service content 408 to adjust in response to the inputs. This may include, for example, moving to a next step, suggesting other options, providing additional information, displaying diagrams, zooming in/out, playing videos, offering different recommendations if actions are not successful, and so forth.

In further embodiments, the service content may be displayed via a mobile computing device and/or a headset/wearable in an augmented or virtual reality setting. For example, the LLM-based service assistant 400 may be configured to display parts lists, instructions, schematics, identify components, etc. in glasses, a headset, or some other wearable device so the service technician can use both hands to perform one or more tasks. However, in other embodiments, the augmented reality setting may be displayed via a mobile device (e.g., phone, tablet, etc.) using a camera or other imaging device of the mobile device and overlaying content on top of images. Along these lines, a camera of the mobile device or virtual/augmented reality wearable device may be used to capture images of the service technician preparing to perform a task and/or performing a task to confirm that the service technician has all of the tools/materials for performing the task, is performing the task on the correct component, and has performed the task the correct way. For example, a service technician may layout tools and/or materials for performing a task, use a camera or imaging device to capture an image of the tools/materials, and confirm that that service technician has all of the tools/materials to perform the task. If the service technician is missing anything, the LLM-based service assistant 400 may display a notification to bring it to the service technician's attention. Similarly, the camera or imaging device may be used to collect images as a task is performed. The LLM-based service assistant 400 may confirm that the task is being performed on the correct component based on serial number, a label, a barcode, an RFID tag, the location, the shape, color, or other visual cues, and so forth. Further, the LLM-based service assistant 400 may confirm that the task is being performed correctly. For example, the LLM-based service assistant 400 may confirm that steps are performed in the correct order, that the fasteners are loosened/tightened in the correct order and to the correct torque specification, that the correct settings are used, and so forth. Moreover, the service technician may provide inputs in the form of voice commands, gestures, eye movement, and so forth requesting performance of some task by the LLM-based service assistant 400. This may include, for example, asking for clarification, asking to repeat something, asking for more information, asking to display a schematic or image (e.g., a pinout), zoom in/out, as if an activity is being performed correctly, identify components, describe the next step, describe a next troubleshooting step, call for assistance, etc.

The LLM-based service assistant 400 may be configured to take in and consider large amounts of information, identify trends/correlations, and make specific recommendations to a service technician. In some embodiments, the LLM-based service assistant 400 may use this information to identify causes for problems that have already occurred and recommend remedies for those problems. However, the LLM-based service assistant 400 may also be configured to collect and analyze vast quantities of information and make recommendations that preventative maintenance/service be performed before a problem occurs. For example, the LLM-based service assistant 400 may collect weather data to identify a pattern in the weather (e.g., a polar vortex), recognize that the last time the pattern occurred, a few days later a cold front arrived at the factory and ambient temperatures in the factory fell by a large amount, causing grease to become more viscous and/or one or more seals to harden, resulting in one or more problems arising and the industrial automation system having to be taken offline. In response, the LLM-based service assistant 400 may generate and transmit a notification recommending that a service technician add grease to one or more components or perform some other preventative service/maintenance. Similar techniques may be used by the LLM-based service assistant 400 to analyze large amounts of data, identify trends/correlations, recognize problems before they occur, and recommend preventative service/maintenance to prevent the problem from occurring or reduce the effects of the problem when it does occur.

As previously described, once service content 408 has been generated, additional inputs may be received providing feedback on the service content 408 or requesting additional content. For example, inputs may be provided requesting modifications to the service content 408. Accordingly, interaction with the LLM-based service assistant 400 may be via a chat-style interface in which a user provides inputs and the LLM-based service assistant 400 provides outputs/responses and the exchanges between the user and the LLM-based service assistant 400 are displayed in the same window in chronological order. In such an embodiment, additional inputs may be provided in response to service content 408 as follow-up questions and/or feedback, which may seek additional information, modifications to the output, new outputs, and so forth.

Figure 6:
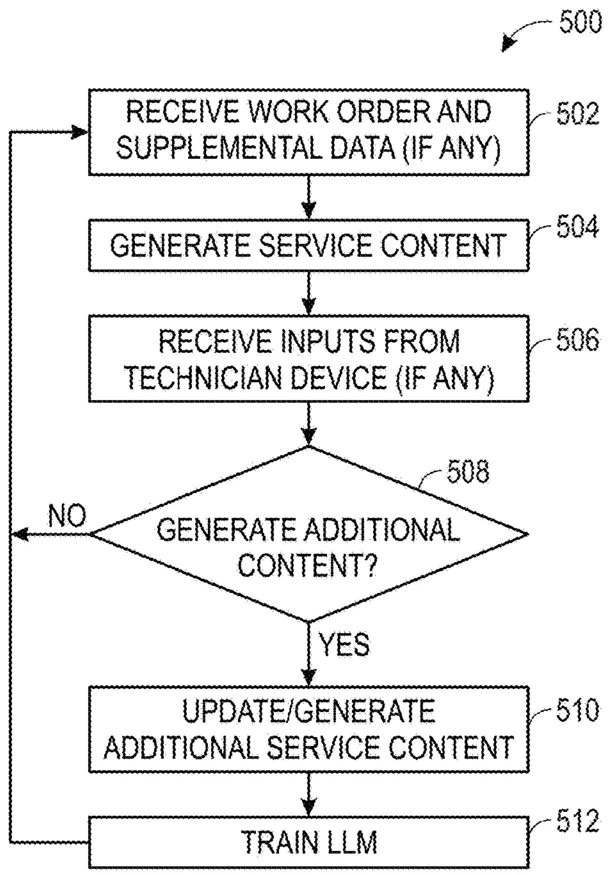
FIG. 6 is a flow chart of a process for operating the LLM-based service assistant of FIG. 5, in accordance with an embodiment.

FIG. 6 is a flow chart of a process 500 for operating the LLM-based service assistant. At block 502, the process 500 receives a work order and supplemental data, if any. The work order may be automatically generated when some condition (e.g., a problem being experienced) is detected/reported, or generated based on inputs provided by a person describing a problem being experienced by the industrial automation system. The work order may or may not be accompanied by one or more pieces of supplemental data or files. The supplemental data may include, for example, service history of a device, maintenance history of a device, device configuration information, device identity information, rule sets to be applied to one or more devices, operating state history data, forensic "black box" data, device health information, baseline data, product manuals, troubleshooting guides, decision trees, instructions for performing various tasks (e.g., text, images, video, etc. pulled from internal sources within the enterprise, or from external sources, such as the internet), and so forth.

At block 504, the process 500 uses one or more trained LLMs to generate service content based on the work order and the supplemental data, if any. For example, the service content may include a static document describing a guided workflow (e.g., for diagnosing and resolving the problem that are unique to the device and the circumstances under which it was operating when the problem occurred), a web page, a mobile application, virtual/augmented reality content, and so forth, or some combination thereof. In embodiments in which the service content is static (e.g., a document or static content displayed via a webpage or an application), the service content may include a trouble shooting guide, a list of steps, flow charts, images, schematics, and so forth that can be utilized by the service technician to address the problem. In embodiments in which the service content is dynamic, the service content may be displayed via a mobile computing device and/or a headset/wearable (e.g., a virtual reality or augmented reality headset). In such embodiments, the service content may be dynamic in that the service content may be responsive to inputs provided by a service technician (block 506). That is, inputs may be provided that cause the service content to adjust in response to the inputs. This may include, for example, moving to a next step, suggesting other options, providing additional information, displaying diagrams, zooming in/out, playing videos, offering different recommendations if actions are not successful, and so forth.

Service content that utilizes augmented/virtual reality may be displayed via a mobile device and/or a wearable device (e.g., headset). In such embodiments, inputs may be received via an interface device (e.g., a keypad, touchscreen, controller, etc.), voice commands, gestures, eye movement, etc. Further, a camera of the mobile device or virtual/augmented reality wearable device may be used to capture images of the service technician preparing to perform a task and/or performing a task to confirm that the service technician has all of the tools/materials for performing the task, is performing the task on the correct component, and has performed the task the correct way. Accordingly, at block 508, the process may determine whether to adjust the service content or generate additional service content. If the service content is not to be adjusted and additional service content is not to be generated, the process 500 may return to block 502.

If the service content is to be adjusted and/or additional service content is to be generated, the process 500 may proceed to block 510 and update the service content and/or generate additional service content. This may include, for example generating a new workflow based on updated parameters, proceeding to a new block of a workflow, providing clarification, repeating information, providing additional information, presenting an image or video, zooming in/out, providing an indication that one or more tools and/or materials are missing, providing an indication that the correct or incorrect component is being used or worked on, providing an indication that a task was or was not performed properly, and so forth.

At block 512, the one or more LLMs are trained. As previously discussed, the one or more LLMs may be trained using training data that may include product manuals, troubleshooting guides, decisions trees, data pulled from the internet (e.g., product information, instructions for performing different tasks, etc.), customer data, digested incident logs, rule sets, device operating state history, device configuration data, device health information, baseline data, time series data, log data, process data, service data, maintenance data, inputs/feedback provided during use, and so forth. In some embodiments, the operator of the industrial automation system and/or OT network may utilize externally available data (e.g., publicly available data or data accessible via a data subscription service) to diversify training data for the one or more LLMs. As previously described, in some embodiments, the one or more LLMs, or an application/service that manages the one or more LLMs may recognize that one of the LLMs lacks training data in a particular area or lacks a specific source of information to ground the LLM's responses in truth. In such embodiments, one or more queries may be generated to retrieve such data from available databases, from the internet via an internet/web search, or from some other available information source. In other embodiments, the one or more LLMs may be trained by a service provider that provides OT maintenance/service to multiple customers, collects data from those customers in the provision of the OT services, and trains and/or retrains the one or more LLMs based on the collected data. The trained LLM may be stored locally or remotely and is made accessible to the service assistant.

The present disclosure is related to an LLM-based service assistant to consider information about an industrial automation system and help identify relevant information to address a problem experienced by the industrial automation system. The LLM may be trained on, for example, product manuals, troubleshooting guides, decisions trees, data pulled from the internet (e.g., product information, instructions for performing different tasks, etc.), customer data, digested incident logs, rule sets, device operating state history, device configuration data, device health information, baseline data, time series data, log data, process data, service data, maintenance data, etc. After a work order for the problem is generated, the LLM-based service assistant may receive the work order.

In some cases, supplemental data may be received along with the work order. The supplemental data may include, for example, service history of a device, maintenance history of a device, device configuration information, device identity information, rule sets to be applied to one or more devices, operating state history data, forensic "black box" data, device health information, baseline data, product manuals, troubleshooting guides, decision trees, instructions for performing various tasks (e.g., text, images, video, etc. pulled from internal sources within the enterprise, or from external sources, such as the internet), and so forth. The LLM-based service assistant may generate service content, such as a guided workflow, for addressing the problem experienced by the industrial automation system.

The service content may set forth a guided workflow provided via one or more documents, a mobile application, a web page, a virtual reality headset, an augmented reality device, and so forth. In some embodiments, inputs may be provided via a client device, to which the LLM-based service assistant may respond. For example, the LLM-based service assistant may use a camera or other imaging system to confirm that the service agent has all of the tools/materials used in upcoming tasks, and/or that the tasks are being performed correctly. The LLM-based service assistant may also be configured to zoom in/out, repeat utterances, provide explanation, provide more details, proceed to the next step if a step is not successful, display schematics, answer questions, and so forth. Accordingly, in some embodiments, the LLM-based service assistant may engage in an iterative, back and forth exchange with a service technician via the client device. In response to feedback from the service technician, certain actions being successful or unsuccessful, the problem being resolved or unresolved, etc., the one or more LLMs may be retrained. Accordingly, the LLM-based OT service assistant helps service technicians identify the causes of problems, identify how to remedy the problems, and walk a service technician through actually resolving the problem faster, resulting in faster, more efficient resolution of problems, less time and resources spent resolving problems, and less downtime for industrial automation systems.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112(f).

The invention claimed is:

1. A method, comprising:

receiving a work order associated with a problem experienced by an industrial automation device of an industrial automation system configured to perform an industrial automation process;

receiving, from the industrial automation device within the industrial automation system, supplemental data comprising a service history, a maintenance history, configuration information, one or more rule sets, and baseline data of the industrial automation device, the industrial automation system, the industrial automation process, or any combination thereof, generating, via processing circuitry, using one or more large language models (LLMs), a guided workflow for diagnosing and resolving the problem associated with the work order unique to the industrial automation device and one or more circumstances under which the industrial automation device was operating when the problem occurred based on the work order and the supplemental data, wherein the one or more LLMS is trained on one or more product manuals, one or more troubleshooting guides, and device configuration data, and wherein the guided workflow comprises a list of steps to resolve the problem;

providing the guided workflow to a mobile computing device for display via a user interface;

receiving, from a camera of an imaging system, one or more images;

analyzing the one or more images to identify if the one or more steps of the guided workflow are being performed on a correct component of the industrial automation device based on an identified serial number, label, barcode, RFID tag, location, shape, or color of the component of the industrial automation device;

in response to the one or more steps of the guided workflow not being performed correctly, updating at least one task of the guided workflow;

providing an updated guided workflow to the mobile computing device for display via the user interface, wherein the updated guided workflow comprises at least one modified step;

receiving, from the mobile computing device, an input indicating that the problem was resolved by performing an action; and retraining the one or more LLMs based on the problem being resolved by performing the action to reduce potential downtime of the industrial automation system.

2. The method of claim 1, wherein the guided workflow is configured to be displayed via a virtual reality device or an augmented reality device.

3. The method of claim 1, comprising:

receiving, from the mobile computing device, an input comprising a request to perform a task;

updating the guided workflow based on the request to perform the task, wherein the update to the guided workflow satisfies the task; and providing the updated guided workflow to the mobile computing device.

4. The method of claim 1, comprising:

receiving, from the mobile computing device, an input comprising a request to modify the guided workflow;

updating the guided workflow based on the request to modify the guided workflow; and providing the updated guided workflow to the mobile computing device.

5. The method of claim 1, comprising training the one or more LLMs using a training data set, wherein the training data set comprises the one or more product manuals, the one or more troubleshooting guides, the device configuration data, and one or more decisions trees, instructions for performing one or more tasks, customer data, digested incident logs, rule sets, device operating state history, device health information, baseline data, time series data, log data, process data, service data, maintenance data, data retrieved from a database, results of a web search, or any combination thereof.

6. The method of claim 1, wherein the guided workflow is dynamically updated based on one or more inputs from a service technician.

7. A method, comprising:

receiving, via a mobile computing device, a guided workflow generated using one or more large language models (LLMs) in response to receiving a work order associated with a problem experienced by an industrial automation device of an industrial automation system configured to perform an industrial automation process and supplemental data comprising a service history, a maintenance history, configuration information, one or more rule sets, and baseline data of the industrial automation device, the industrial automation system, the industrial automation process, or any combination thereof, wherein the one or more LLMs is trained on one or more product manuals, one or more troubleshooting guides, and device configuration data, and wherein the guided workflow comprises a list of steps to diagnose and resolve the problem associated with the work order unique to the industrial automation device and one or more circumstances under which the industrial automation device was operating when the problem occurred;

displaying, via a user interface of the mobile computing device, the guided workflow;

collecting, from a camera of an imaging system, one or more images;

analyzing the one or more images to identify if the one or more steps of the guided workflow are being performed on a correct component of the industrial automation device based on an identified serial number, label, barcode, RFID tag, location, shape, or color of the component of the industrial automation device;

in response to the one or more steps of the guided workflow being performed on an incorrect component, modifying one or more steps of the guided workflow; and in response to the one or more steps of the guided workflow being performed on the correct component, providing a notification indicative that the one or more steps are being performed correctly;

receiving, from the mobile computing device, an input indicating that the problem was resolved by performing an action; and retraining the one or more LLMs based on the problem being resolved by performing the action to reduce potential downtime of the industrial automation system.

8. The method of claim 7, wherein the one or more LLMs are hosted on a remote server or a cloud server.

9. The method of claim 8, comprising:

transmitting the work order and the supplemental data to the remote server or the cloud server; and receiving, from the cloud server or the remote server, the guided workflow.

10. The method of claim 7, wherein the one or more LLMs are hosted on an edge device.

11. The method of claim 7, wherein the one or more LLMs are hosted on a compute surface within an OT network associated with the industrial automation system.

12. The method of claim 7, wherein the supplemental data further comprises identity information for one or more devices within the industrial automation system, operating state history data for one or more devices within the industrial automation system, forensic data collected from the industrial automation system, health information for one or more devices within the industrial automation system, one or more product manuals, one or more troubleshooting guides, one or more decision trees, one or more sets of instructions for performing a task, or any combination thereof.

13. A non-transitory computer readable medium storing instructions that, when executed by processing circuitry, cause the processing circuitry to perform operations comprising:

receiving a work order associated with a problem experienced by an industrial automation device of an industrial automation system configured to perform an industrial automation process;

receiving, from the industrial automation device within the industrial automation system, supplemental data comprising a service history, a maintenance history, configuration information, one or more rule sets, and baseline data of the industrial automation device, the industrial automation system, the industrial automation process, or any combination thereof;

generating, via the processing circuitry, using one or more large language models (LLMs), a guided workflow for diagnosing and resolving the problem associated with the work order unique to the industrial automation device and one or more circumstances under which the industrial automation device was operating when the problem occurred based on the work order and the supplemental data, wherein the one or more LLMs is trained on one or more product manuals, one or more troubleshooting guides, and device configuration data, and wherein the guided workflow comprises a list of steps to resolve the problem;

providing the guided workflow to a mobile computing device for display via a user interface;

receiving, from a camera of an imaging system, one or more images;

analyzing the one or more images to identify if the one or more steps of the guided workflow are being performed on a correct component of the industrial automation device based on an identified serial number, label, barcode, RFID tag, location, shape, or color of the component of the industrial automation device;

in response to the one or more steps of the guided workflow not being performed correctly, updating at least one task of the guided workflow;

providing an updated guided workflow to the mobile computing device for display via the user interface, wherein the updated guided workflow comprises at least one modified step;

receiving, from the mobile computing device, an input indicating that the problem was resolved by performing an action; and retraining the one or more LLMs based on the problem being resolved by performing the action to reduce potential downtime of the industrial automation system.

14. The non-transitory computer readable medium of claim 13, wherein the one or more LLMs are hosted on the mobile computing device.

15. The non-transitory computer readable medium of claim 13, wherein the operations comprise:

analyzing the one or more images to identify one or more objects available to a service agent of the industrial automation device in the one or more images; and transmitting a notification to the mobile computing device based on the one or more objects in the one or more images.

16. The non-transitory computer readable medium of claim 13, wherein the operations comprise:

receiving, from the mobile computing device, feedback on the guided workflow; and retraining the one or more LLMs based on the feedback.

17. The non-transitory computer readable medium of claim 13, wherein the operations comprise:

receiving one or more datasets;

analyzing the one or more datasets to recognize one or more trends, one or more correlations, or both;

identifying, based on the recognized one or more trends, the one or more correlations, or both, a predictive maintenance operation; and transmitting a notification to the mobile computing device recommending the predictive maintenance operation.

18. The non-transitory computer readable medium of claim 14, wherein the supplemental data comprises a service history of the industrial automation system, a maintenance history of the industrial automation system, configuration information for one or more devices within the industrial automation system, identity information for one or more devices within the industrial automation system, rule sets to be applied to one or more devices within the industrial automation system, operating state history data for one or more devices within the industrial automation system, forensic data collected from the industrial automation system, health information for one or more devices within the industrial automation system, baseline data for the industrial automation system, one or more product manuals, one or more troubleshooting guides, one or more decision trees, one or more sets of instructions for performing a task, or any combination thereof.

* * * * *